United States Patent
Kaufmann et al.

(10) Patent No.: US 9,540,044 B2
(45) Date of Patent: Jan. 10, 2017

(54) HAND WHEEL ANGLE FROM VEHICLE DYNAMIC SENSORS OR WHEEL SPEEDS

(71) Applicant: STEERING SOLUTIONS IP HOLDING CORPORATION, Saginaw, MI (US)

(72) Inventors: Timothy W. Kaufmann, Frankenmuth, MI (US); Tao Yang, Midland, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 14/529,726

(22) Filed: Oct. 31, 2014

(65) Prior Publication Data

US 2015/0142269 A1 May 21, 2015

Related U.S. Application Data

(60) Provisional application No. 61/904,691, filed on Nov. 15, 2013.

(51) Int. Cl.
*G06F 17/00* (2006.01)
*B62D 15/02* (2006.01)
*B62D 5/04* (2006.01)

(52) U.S. Cl.
CPC ............ *B62D 15/024* (2013.01); *B62D 5/049* (2013.01); *B62D 5/0463* (2013.01)

(58) Field of Classification Search
CPC ..... B60W 10/06; B60W 10/11; B60W 10/184; B60W 10/20; B60W 2520/10; B62D 5/00; B62D 6/008
USPC ...... 701/36, 42, 78, 83, 90, 43, 41; 180/402, 180/403, 405, 406, 407, 446, 421, 443; 702/104

See application file for complete search history.

(56) References Cited

U.S. PATENT DOCUMENTS

| | | | |
|---|---|---|---|
| 4,660,671 A | 4/1987 | Behr et al. | |
| 4,800,974 A | 1/1989 | Want et al. | |
| 4,874,053 A | 10/1989 | Kimura et al. | |
| 5,029,466 A | 7/1991 | Nishihara et al. | |
| 5,473,539 A | 12/1995 | Shimizu et al. | |
| 5,709,281 A | 1/1998 | Sherwin et al. | |
| 5,919,241 A | 7/1999 | Bolourchi et al. | |
| 5,927,421 A * | 7/1999 | Fukada ......................... | 180/197 |
| 5,948,030 A * | 9/1999 | Miller et al. .................... | 701/41 |
| 5,992,557 A | 11/1999 | Nakamura et al. | |
| 6,032,091 A | 2/2000 | Noro et al. | |

(Continued)

FOREIGN PATENT DOCUMENTS

| CN | 100999223 B | 7/2007 |
|---|---|---|
| CN | 102556152 A | 7/2012 |

(Continued)

OTHER PUBLICATIONS

European Search Report for related Application No. 14166178.5 dated Aug. 22, 2014; 7 pages.

(Continued)

*Primary Examiner* — McDieunel Marc
(74) *Attorney, Agent, or Firm* — Cantor Colburn LLP (57) ABSTRACT

A method of controlling a power steering system of a vehicle is provided. The method determines a yaw rate of the vehicle. The method generates a hand wheel angle signal that indicates a position of a hand wheel of the vehicle based on the yaw rate. The method controls the power steering system by using the hand wheel angle signal.

15 Claims, 7 Drawing Sheets

(56) References Cited

U.S. PATENT DOCUMENTS

| | | | |
|---|---|---|---|
| 6,152,254 | A | 11/2000 | Phillips |
| 6,223,852 | B1 | 5/2001 | Mukai et al. |
| 6,250,419 | B1 | 6/2001 | Chabaan et al. |
| 6,298,941 | B1 | 10/2001 | Spadafora |
| 6,370,459 | B1 | 4/2002 | Phillips |
| 6,588,541 | B2 | 7/2003 | Norman et al. |
| 6,687,590 | B2 | 2/2004 | Kifuku et al. |
| 6,742,620 | B2 | 6/2004 | Eidam et al. |
| 6,959,970 | B2* | 11/2005 | Tseng .................. B60T 8/1708 188/112 R |
| 7,040,450 | B2 | 5/2006 | Nagase et al. |
| 7,558,661 | B2* | 7/2009 | Sundaram et al. ............. 701/70 |
| 7,596,441 | B2 | 9/2009 | Yokota et al. |
| 7,885,750 | B2* | 2/2011 | Lu .................... 701/90 |
| 7,954,593 | B2 | 6/2011 | Dornhege et al. |
| 7,974,754 | B2 | 7/2011 | Nakatsu |
| 7,975,801 | B2 | 7/2011 | Tashiro |
| 8,010,252 | B2* | 8/2011 | Getman et al. ................ 701/37 |
| 8,108,105 | B2 | 1/2012 | Saruwatari et al. |
| 8,165,770 | B2* | 4/2012 | Getman et al. ................ 701/70 |
| 8,219,283 | B2 | 7/2012 | Recker et al. |
| 8,571,759 | B2 | 10/2013 | Oblizajek et al. |
| 8,666,605 | B2 | 3/2014 | Delarche et al. |
| 8,666,607 | B2 | 3/2014 | Kojo |
| 8,843,276 | B2 | 9/2014 | Kojo et al. |
| 8,903,606 | B2 | 12/2014 | Kleinau et al. |
| 8,977,433 | B2 | 3/2015 | Kojima |
| 8,977,437 | B2 | 3/2015 | Tamaizumi et al. |
| 9,387,875 | B2 | 7/2016 | Shimizu et al. |
| 9,409,595 | B2 | 8/2016 | Varunjikar et al. |
| 2002/0026267 | A1 | 2/2002 | Kifuku |
| 2002/0092696 | A1* | 7/2002 | Bohner et al. ................ 180/405 |
| 2002/0177932 | A1 | 11/2002 | Kifuku et al. |
| 2002/0179362 | A1 | 12/2002 | Norman et al. |
| 2003/0074120 | A1 | 4/2003 | Kleinau |
| 2004/0024505 | A1* | 2/2004 | Salib et al. .................... 701/38 |
| 2004/0055810 | A1 | 3/2004 | Chabaan |
| 2004/0099469 | A1 | 5/2004 | Koibuchi et al. |
| 2004/0117088 | A1 | 6/2004 | Dilger |
| 2005/0189163 | A1 | 9/2005 | Barton et al. |
| 2005/0206224 | A1* | 9/2005 | Lu .................................... 303/7 |
| 2005/0206229 | A1* | 9/2005 | Lu et al. ...................... 303/123 |
| 2005/0246085 | A1* | 11/2005 | Salib et al. ..................... 701/70 |
| 2005/0256620 | A1 | 11/2005 | Kato |
| 2007/0299580 | A1* | 12/2007 | Lin ........................ B60W 10/20 701/41 |
| 2008/0147276 | A1 | 6/2008 | Pattok et al. |
| 2009/0024281 | A1 | 1/2009 | Hwang et al. |
| 2009/0125186 | A1 | 5/2009 | Recker et al. |
| 2009/0143938 | A1 | 6/2009 | Nishimura |
| 2009/0216407 | A1 | 8/2009 | Cottard et al. |
| 2009/0292421 | A1 | 11/2009 | Williams et al. |
| 2009/0294206 | A1 | 12/2009 | Oblizajek et al. |
| 2010/0100283 | A1* | 4/2010 | Hales et al. ..................... 701/42 |
| 2011/0022272 | A1 | 1/2011 | Hung et al. |
| 2011/0218706 | A1* | 9/2011 | Mori et al. ..................... 701/36 |
| 2012/0041644 | A1 | 2/2012 | Turner |
| 2012/0199414 | A1 | 8/2012 | Shimizu et al. |
| 2012/0261209 | A1 | 10/2012 | Shiino |
| 2013/0024072 | A1 | 1/2013 | Michelis et al. |
| 2013/0030654 | A1 | 1/2013 | Oblizajek et al. |
| 2013/0073146 | A1 | 3/2013 | Konomi et al. |
| 2013/0151066 | A1 | 6/2013 | Koukes et al. |
| 2013/0261894 | A1 | 10/2013 | Kojima |
| 2014/0005894 | A1 | 1/2014 | Aoki |
| 2014/0324294 | A1* | 10/2014 | Champagne ......... B62D 5/0463 701/41 |
| 2015/0191200 | A1 | 7/2015 | Tsubaki et al. |

FOREIGN PATENT DOCUMENTS

| | | |
|---|---|---|
| CN | 102917939 A | 2/2013 |
| CN | 102556152 A | 7/2013 |
| DE | 19634728 C1 | 4/1998 |
| DE | 10344279 A1 | 4/2004 |
| DE | 102008051552 A1 | 4/2009 |
| DE | 102008036001 A1 | 2/2010 |
| EP | 0353995 A2 | 2/1990 |
| EP | 1508495 A2 | 2/2005 |
| EP | 1995150 A2 | 11/2008 |
| EP | 2028080 A1 | 2/2009 |
| EP | 1808359 B1 | 4/2009 |
| EP | 2184218 A2 | 5/2010 |
| EP | 2275323 A1 | 1/2011 |
| EP | 2223838 B1 | 11/2011 |
| EP | 2492168 A1 | 8/2012 |
| EP | 2497698 A1 | 9/2012 |
| GB | 2454788 A | 5/2009 |
| JP | 2001106099 | 4/2001 |
| JP | 2003002222 A | 1/2003 |
| JP | 3712876 B2 | 11/2005 |
| JP | 2006143151 | 6/2006 |
| JP | 3819261 B2 | 9/2006 |
| JP | 2006248250 A | 9/2006 |
| JP | 2007514602 A | 6/2007 |
| JP | 2009006985 | 1/2009 |
| JP | 2009051292 A | 3/2009 |
| JP | 2011051409 A | 3/2011 |
| KR | 2006083578 A | 7/2006 |
| WO | 2005097577 A1 | 10/2005 |
| WO | 2011148240 A1 | 12/2011 |
| WO | 2012066704 A1 | 5/2012 |
| WO | 2012176553 A1 | 12/2012 |

OTHER PUBLICATIONS

Gillespie, T.D.; "Fundamentals of Vehicle Dynamics"; Warrendale, PA; Society of Automotive Engineers; 1992; ISBN 1560911999, 9781560911999; pp. 205-206.

van der Jagt, Pim; "Prediction of Steering Efforts During Stationary or Slow Rolling Parking Maneuvers"; Ford Forschungszentrum Aachen GmbH.; Oct. 27, 1999; 20 pages.

European Search Report for Application No. EP14192466.2 dated Apr. 9, 2015.

O.I. Katzourakis, et al.; "Steering Force Feedback for Human-Machine-Interface Automotive Experiments"; IEEE Transactions on Instrumentation and Measurement, vol. 60, No. 1, pp. 32-43, Jan. 2011.

English Translation of Chinese Office Action for related CN Application No. 20121058416.7; Issued Dec. 3, 2014; 15 pages.

English Translation of Chinese Office Action for related CN Application No. 201210586416.7; Issued Aug. 12, 2015; 14 pages.

Extended European Search Report for related EP Application No. 12192967.3, dated Apr. 2, 2013; 8 pages.

Extended European Search Report for related EP Application No. 14156987.1; dated Jan. 21, 2015; 8 pages.

Extended European Search Report for related EP Application No. 15173865.5; dated Nov. 23, 2015; 10 pages.

J.C.F. de Winter, et al.; "A Two-Dimensional Weighting Function for a Driver Assistance System"; IEEE Transactions on Systems, Man and Cybernetics B, Cybern., vol. 38, No. 1, pp. 189-198, Feb. 2008.

U.S. Appl. No. 13/299,407, filed Nov. 18, 2011, titled Road Wheel Disturbance Rejection.

U.S. Appl. No. 13/792,897, filed Mar. 11, 2013, titled "Road Wheel Disturbance Rejection Based on Hand Wheel Acceleration".

English Translation of CN Office Action & Search Report for related CN Application No. 2014110331120.X; Issued Nov. 30, 2015; 9 pages.

Extended EP Search report from related Application No. 15184544.3-1755: Mail date: Mar. 16, 2014; 7 pages.

Katzourakis, D.I., et al.; "Road-Departure Prevention in an Emergency Obstacle Avoidance Situation"; IEEE Transactions on Systems, Man, and Cybernetics: Systems; vol. 44, Issue 5; vol. 44, No. 5, pp. 621-629.

Chinese Office Action for related Chinese Application No. CN201410086920.X, dated May 23, 2016, 8 pages.

(56) References Cited

OTHER PUBLICATIONS

Ansgar Rehm, Vehicle Velocity Estimation by Dynamic Inversion of Wheel Force Generation; Control Conference (ECC), 2009 European Year: 2009; pp. 4798-4803.

English Translation of CN Office Action & Search Report for related CN Application No. 201410086920.X; Issued Nov. 5, 2015; 10 pages.

Peroutka, et al., Design Considerations for Control of Traction Drive with Permanent Magnet Synchronous Machine; Power Electronics and MOtion Control Conference, 2008, EPE-PEMC 2008, 13th Year: 2008; pp. 1529-1534, DOI: 10.1109/EPEPEMC.2008.4635484.

Pornsarayouth, S., et al., Sensor Fusion of Delay and Non-delay Signal using Kalman Filter with Moving covariance, Robotics and Biomimetics, 2008, ROBIO 2008, IEEE International Conference on: Year 2009; pp. 2045-2049, DOI: 10.1109/ROBIO.2009.4913316.

Wilhelm, et al., Friction Compensation Control for Power Steering, Control Systems Technology, IEEE Transactions on; Year: 2015, Volume: PP, Issue: 99; pp. 1-14, DOI:10.1109/TCST.2015.2483561.

Hsu, Yung-Hsiang Judy, "Estimation and Control of Lateral Tire Forces using Steering Torque"; Dissertaion of Stanford University, Mar. 2009; 191 pages.

\* cited by examiner

HAND WHEEL ANGLE FROM VEHICLE DYNAMIC SENSORS OR WHEEL SPEEDS

CROSS-REFERENCE TO RELATED APPLICATION

This patent application claims priority to U.S. Provisional Patent Application Ser. No. 61/904,691, filed Nov. 15, 2013, which is incorporated herein by reference in its entirety.

BACKGROUND OF THE INVENTION

Steering system suppliers have used either a relative hand wheel angle (HWA) sensor or an absolute HWA sensor, or have not used a HWA sensor. The factors in deciding which HWA sensor to use or not to use a HWA position sensor are related to cost vs. performance/feature requirements of a given steering system.

An absolute position sensor usually is a multi-turn device, as a number of turns that the steering hand wheel makes from stop to stop is typically between three and five. In some cases, in order to have a reliable HWA measurement, a physical sensor is required. If a HWA measurement is required at key on, an absolute sensor is required. If the HWA measurement is not required until sometime after the key on and after some driving, an algorithm could learn where the center position of the hand wheel is and provide a calculated absolute position after some learning. In the latter case, the HWA could be measured by a relative hand wheel position sensor at the hand wheel or by a motor position sensor. In both cases, a physical sensor is required to monitor the hand wheel position. Physical sensors cost in building steering systems.

SUMMARY OF THE INVENTION

In one embodiment of the invention, a method of controlling a power steering system of a vehicle is provided. The method determines a yaw rate of the vehicle. The method generates a hand wheel angle signal that indicates a position of a hand wheel of the vehicle based on the yaw rate. The method controls the power steering system by using the hand wheel angle signal.

In another embodiment of the invention, a power steering system of a vehicle is provided. The system includes an electric power steering system and a control module. The control module is configured to determine a yaw rate of the vehicle. The control module is further configured to generate a hand wheel angle signal that indicates a position of a hand wheel of the vehicle based on the yaw rate. The control module is further configured to the electric power steering system by using the hand wheel angle signal.

In yet another embodiment of the invention, a method of controlling a power steering system of a vehicle is provided. The method determines lateral acceleration of the vehicle. The method generates a hand wheel angle signal that indicates a position of a hand wheel of the vehicle based on the lateral acceleration. The method controls the power steering system by using the hand wheel angle signal.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
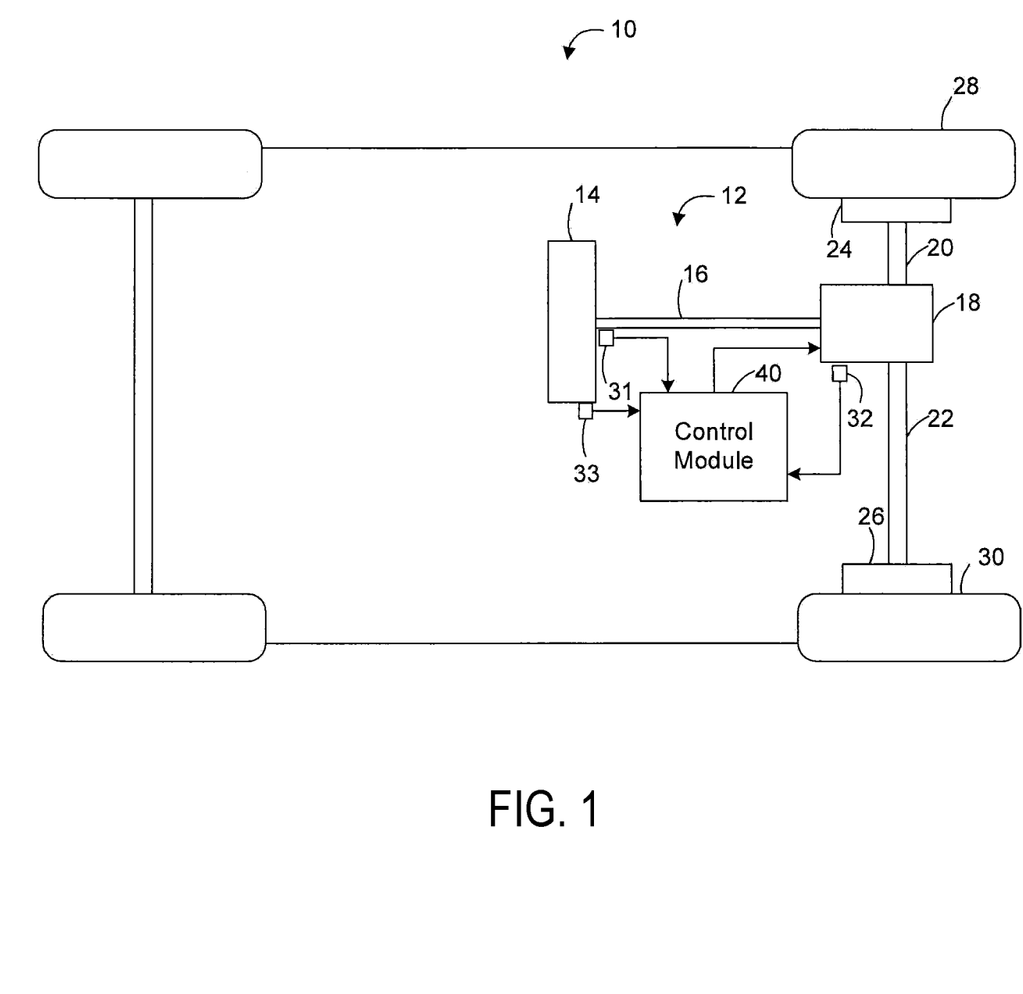
FIG. 1 illustrates a functional block diagram of a steering system in accordance with some embodiments of the invention.

Referring now to FIG. 1, where the invention will be described with reference to specific embodiments without limiting same, an exemplary embodiment of a vehicle 10 including a steering system 12 is illustrated. In some embodiments, the steering system 12 includes a hand wheel 14 coupled to a steering shaft 16. In one exemplary embodiment, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a rack and pinion steering mechanism (not shown) that may be coupled through the steering shaft 16 to a steering actuator motor and gearing (hereinafter referred to as the steering actuator). During operation, as the hand wheel 14 is turned by a vehicle operator (driver), the motor of the steering assist unit 18 provides the assistance to move the tie rods 20, 22 which in turn move steering knuckles 24, 26, respectively, coupled to roadway wheels 28, 30, respectively of the vehicle 10. Although an EPS system is illustrated in FIG. 1 and described herein, it is appreciated that the steering system 12 of the present disclosure can include various controlled steering systems including, but not limited to, steering systems with hydraulic configurations, and steer by wire configurations.

As shown in FIG. 1, the vehicle 10 further includes various sensors 31-33 that detect and measure observable conditions of the steering system 12 and/or of the vehicle 10. The sensors 31-33 generate sensor signals based on the observable conditions. In some embodiments, the sensors 31-33 may include, for example, a hand wheel torque sensor, a hand wheel angle sensor, a lateral acceleration sensor, a yaw rate sensor, road wheel velocity sensors, and other sensors. In some embodiments, the sensors 31-33 do not include any hand wheel angle sensor. That is, the vehicle 10 does not have a hand wheel angle sensor that measures the hand wheel angle. In some embodiments, the vehicle may not have a yaw rate sensor, either. The sensors 31-33 send the signals to the control module 40.

In some embodiments, a control module 40 controls the operation of the steering system 12 and/or the vehicle 10 based on one or more of the enabled sensor signals and further based on the assist torque calculation system and method of the present disclosure. Generally speaking, the control module 40 of some embodiments of the invention generates a hand wheel angle signal based on a yaw rate of the vehicle or lateral acceleration of the vehicle. In some embodiments, the yaw rate is measured by a yaw rate sensor and the yaw rate measurement is supplied to the control module 40. Alternatively or conjunctively, the yaw rate of the vehicle 10 may be estimated based on wheel velocities of the road wheels of the vehicle 10. The lateral acceleration of the vehicle is measured by a lateral acceleration sensor. In some embodiments, the control module 40 uses a speed correction factor to scale the hand wheel angle signal generated from the yaw rate or the lateral acceleration. The scaled hand wheel angle signal is valid over wider range of vehicle velocity. In some embodiments, the hand wheel angle signal is compared with a hand wheel angle signal from a hand wheel angle sensor in order to verify the sensor signal.

Figure 2:
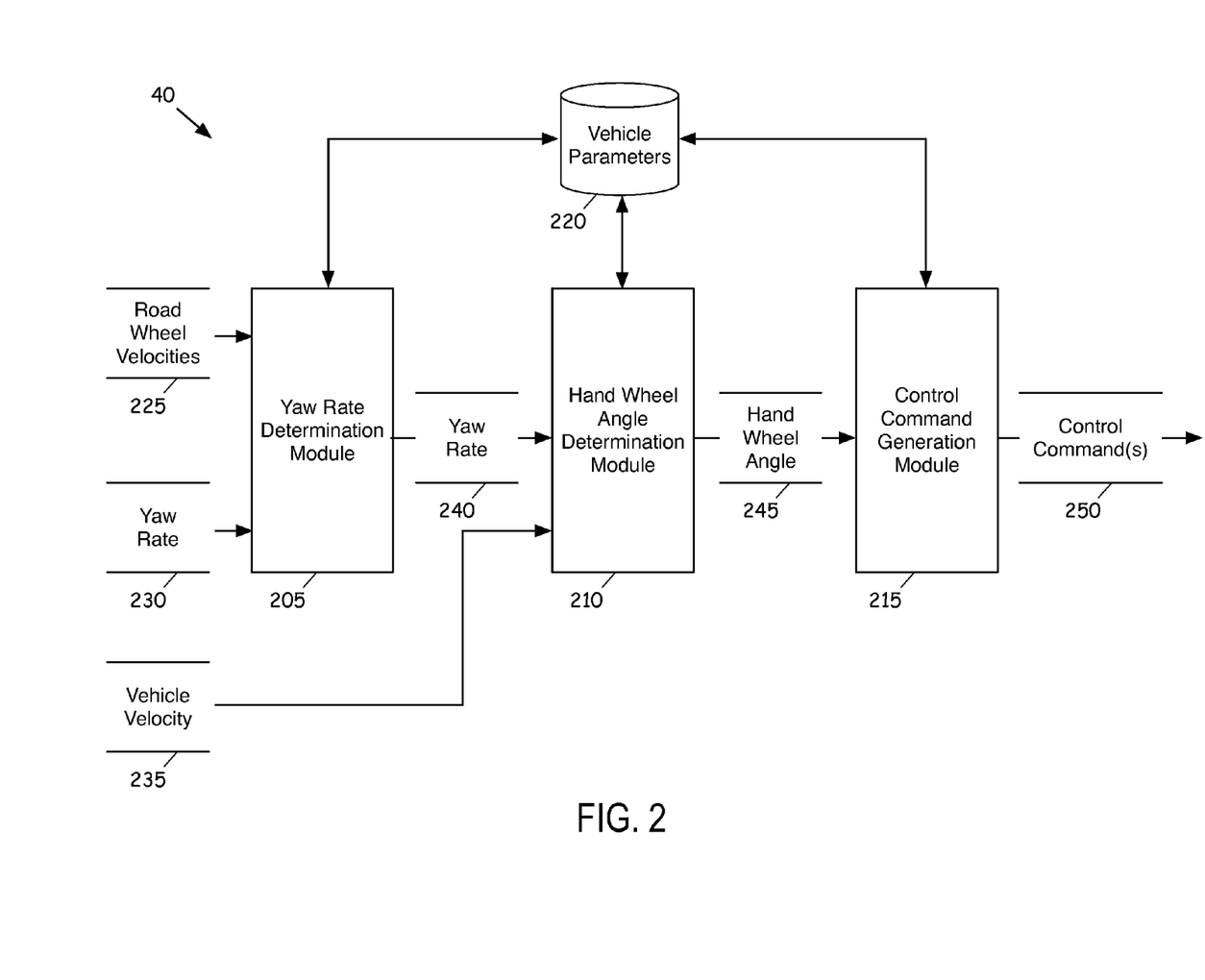
FIG. 2 illustrates a dataflow diagram illustrating a control module in accordance with exemplary embodiments of the invention.

FIG. 2 depicts a dataflow diagram of the control module 40 of FIG. 1 that is used to control the steering system 12 and/or the vehicle 10 of FIG. 1 in accordance with some embodiments of the invention. The control module 40 includes one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules shown in the figures can be combined and/or further partitioned. As can be appreciated, the sub-modules shown in the figures can be implemented as a single control module 40 (as shown) or multiple control modules (not shown). Inputs to the control module 40 can be generated from the sensors of the vehicle 10 (FIG. 1), can be modeled within the control module 40 (e.g., by other sub-modules (not shown)), can be received from other control modules (not shown), and/or can be predefined. In one example, the control module 40 includes a yaw rate determination module 205, a hand wheel angle determination module 210, a control command generation module 215, and a vehicle parameters repository 220.

Figure 3:
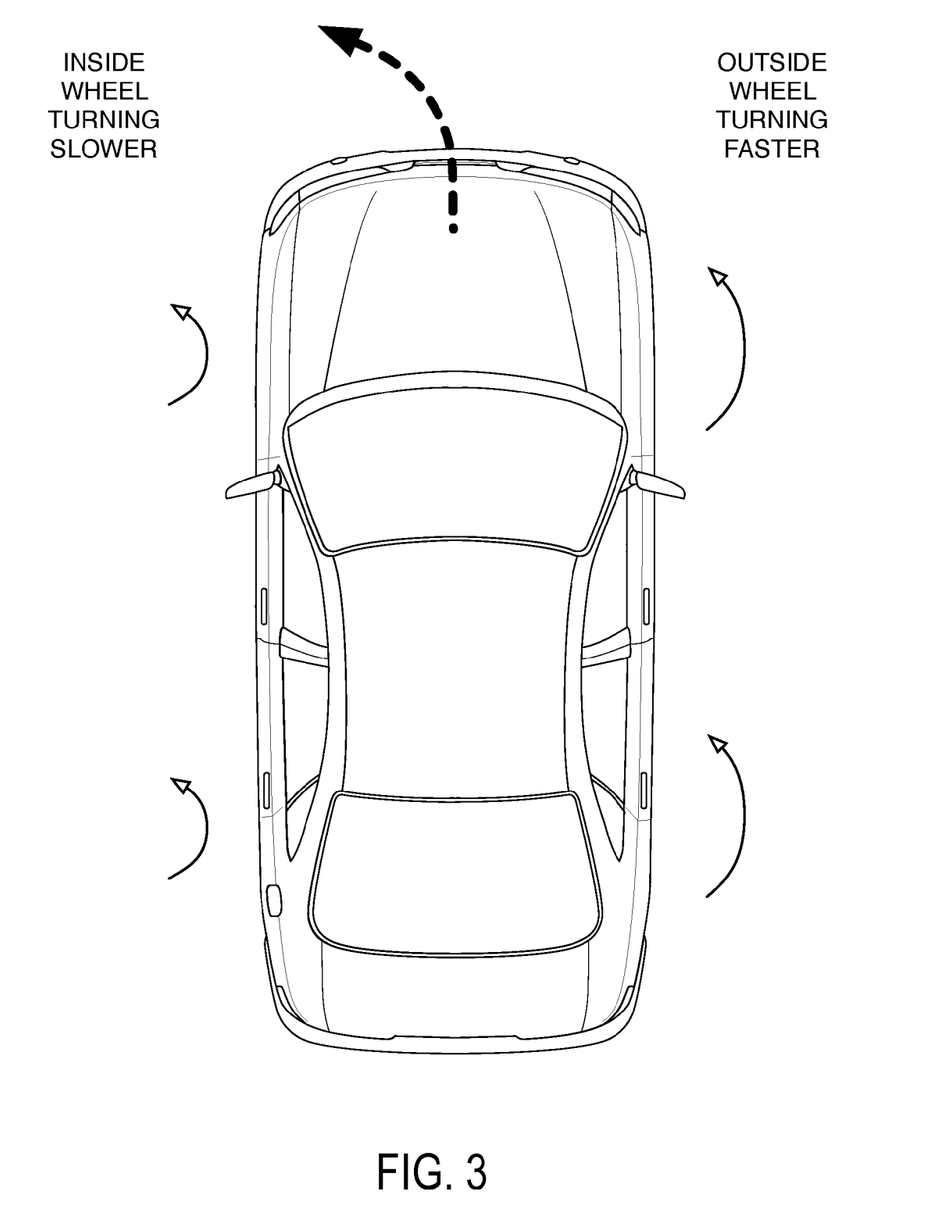
FIG. 3 illustrates a turning vehicle in accordance with exemplary embodiments of the invention.

The yaw rate determination module 205 determines the yaw rate of the vehicle 10. In some embodiments, the yaw rate determination module 205 estimates the yaw rate of the vehicle 10 based on velocities of the road wheels of the vehicle. Specifically, the yaw rate determination module 205 uses the difference between velocities of a pair of road wheels to leverage the fact that the road wheel on the opposite side of a vehicle's turn moves faster than the road wheel on the side of a turn. FIG. 3 illustrates that, for example, the road wheels on the left side of the vehicle 10 turn faster than their respective road wheels on the right side of the vehicle 10 do. Referring back to FIG. 2, the yaw rate determination module 205 of some embodiments uses the following equation (1) to estimate the yaw rate:

$$r = \frac{v_{rr} - v_{rl}}{t_w} \quad (1)$$

where r is the yaw rate of a vehicle in Radians per second, $v_{rr}$ is the linear velocity of the rear right road wheel of the vehicle in meters per second, $v_{rl}$ is the linear velocity of the rear left road wheel of the vehicle in meters per second, and $t_w$ is the track width between the rear left and right road wheels in meters. The velocities 225 of the road wheels of the vehicle 10 that the yaw rate determination module 205 uses to estimate the yaw rate are measured or detected by the road wheel velocity sensors of the vehicle 10. The track width is predetermined, and the yaw rate determination module 205 retrieves the track width from the vehicle parameters repository 220. The yaw rate determination module 205 performs the estimation of the yaw rate periodically or continuously and supplies the yaw rate 240 to the hand wheel angle determination module 210. Alternatively or conjunctively, in some embodiments, the yaw rate determination module 205 determines or estimates the yaw rate 240 of the vehicle 10 by using the yaw rate signal 230 generated by a yaw rate sensor of the vehicle 10.

The hand wheel angle determination module 210 determines the hand wheel angle 245 of the hand wheel of the vehicle 10 based on the yaw rate 240, a vehicle velocity signal 235 and other vehicle parameters. In some embodiments, the hand wheel angle determination module 210 receives the vehicle velocity signal 235 from a vehicle velocity sensor (e.g., speedometer) of the vehicle 10. The vehicle parameters are retrieved from the vehicle parameters repository 220.

In some embodiments, the hand wheel angle determination module 210 uses the following equation (2) to estimate the hand wheel angle of the hand wheel of the vehicle 10:

$$\frac{r}{\delta} = \frac{\frac{V}{wb}}{1 + \frac{us \times V^2}{57.3 \times 9.81 \times wb}} \quad (2)$$

where r is the yaw rate in degrees per second, $\delta$ is a road wheel angle (i.e., an angle that the front road wheels make with respect to the length of the vehicle 10), V is the velocity of the vehicle 10, wb is the wheelbase of the vehicle (i.e., the distance between the centers of the front and real road wheels of the vehicle 10), us is the understeer gradient parameter, 57.3 is a conversion factor for converting radians into degrees, and 9.81 is the gravitational acceleration constant in meter squared per second.

The equation (2) is described on page 206 of Gillespie, T. D. Fundamentals of Vehicle Dynamics. Warrendale, Pa.: Society of Automotive Engineers, 1992 (hereinafter "Gillespie"), which is incorporated herein by reference. The following equation (3) for estimating hand wheel angle is derived from the equation (2) in some embodiments.

$$HWA = sr \times \frac{r \times wb}{V}\left(1 + \frac{us(V) \times V^2}{57.3 \times 9.81 \times wb}\right) \times V_f(V) \quad (3)$$

where HWA is a hand wheel angle, sr is a steering ratio of a vehicle (i.e., a ratio between the turn of the hand wheel and the turn of the road wheels of the vehicle), us is the understeer gradient as a function of the velocity of the vehicle and $V_f(V)$ is the speed correction factor that is a function of the velocity of the vehicle. Compared to the equation (2), the equation (3) includes several new factors, namely, $V_f(V)$ and us(V) that replaces the understeer gradient parameter us of the equation (2). Also, δ in the equation (2) is replaced with HWA. By these new factors, the vehicle velocity range (i.e., a range for V) in which the equation (3) is valid for HWA is extended from the vehicle velocity range in which the equation (2) is valid. That is, the hand wheel angle computed using the equation (3) is valid over a wider vehicle velocity range. In some embodiments, the factors increase as the vehicle velocity increase but saturate after the vehicle velocity reaches a threshold velocity. The factors may be zero when the vehicle velocity is zero.

In some embodiments, the vehicle 10 has a hand wheel angle sensor that generates a hand wheel angle signal. In some such embodiments, the control command generation module 215 or another sub-module (not shown) of the control module 40 may use the hand wheel angle signal 245 to verify the hand wheel angle signal generated by the hand wheel angle sensor. The verification result may indicate whether the hand wheel angle sensor is functioning properly. Using the hand wheel angle signal 245 eliminates the need for another hand wheel angle sensor if such verification is desired in the vehicle 10. If no verification is desired, using the hand wheel angle signal 245 eliminates the need for any hand wheel angle sensor.

The control command generation module 215 generates one or more command signals 250 to control the steering system 12 (not shown in FIG. 2) based on input signals and vehicle parameters. The input signals to the control command generation module 215 include the hand wheel angle signal 215 and other signals from vehicle sensors 31-33 of the vehicle 10. The command signals 250 may include a hand wheel assist torque command, a damping command, etc. to control the motor the steering system 12.

Figure 4:
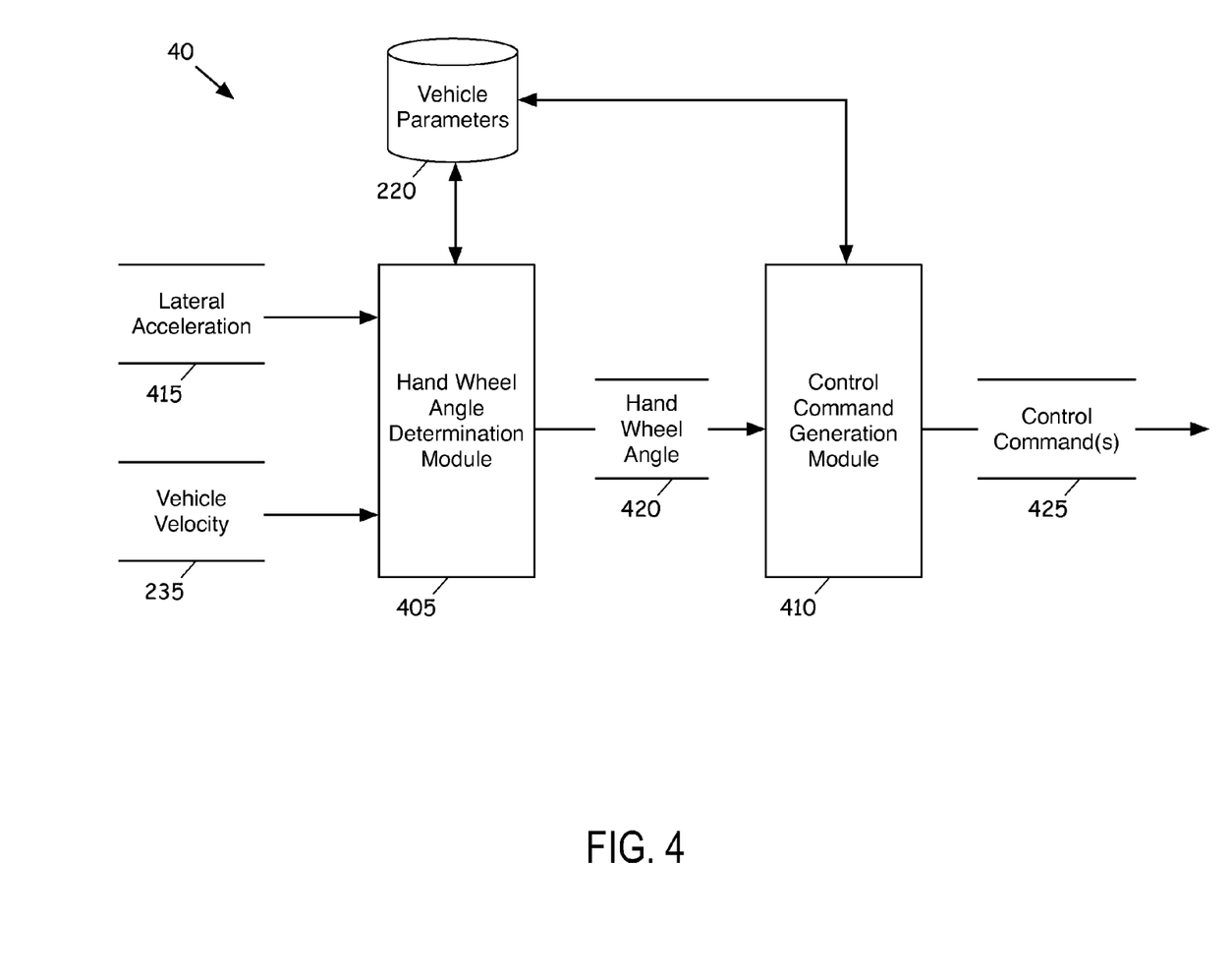
FIG. 4 illustrates a dataflow diagram illustrating a control module in accordance with exemplary embodiments of the invention.

FIG. 4 depicts a dataflow diagram of the control module 40 of FIG. 1 in accordance with some embodiments of the invention. In one example, the control module 40 includes a hand wheel angle determination module 405, a control command generation module 410, and the vehicle parameters repository 220.

The hand wheel angle determination module 405 determines the hand wheel angle 420 of the hand wheel of the vehicle 10 based on the lateral acceleration signal 415, the vehicle velocity signal 235 and other vehicle parameters. In some embodiments, the hand wheel angle determination module 405 receives the lateral acceleration signal 415 from a lateral acceleration sensor of the vehicle 10. In some embodiments, the hand wheel angle determination module 405 receives the vehicle velocity signal 235 from a vehicle velocity sensor (e.g., speedometer) of the vehicle 10. The vehicle parameters are retrieved from the vehicle parameters repository 220.

In some embodiments, the hand wheel angle determination module 405 uses the following equation (4) to estimate the hand wheel angle of the hand wheel of the vehicle 10:

$$\frac{A_y}{\delta} = \frac{\frac{V^2}{wb}}{\left(us \times \frac{V^2}{wb} + (9.81 \times 57.3)\right) \times sr} \quad (4)$$

where $A_y$ is the lateral acceleration in meter squared per second.

The equation (4) is described on page 205 of Gillespie. The following equation (5) for estimating hand wheel angle is derived from the equation (4) in some embodiments:

$$HWA = sr \times \frac{A_y \times wb}{V^2} \left( us(V) \times \frac{V^2}{wb} + (9.81 \times 57.3) \right) \times V_f(V) \quad (5)$$

Compared to the equation (4), the equation (5) includes several new factors, namely, $V_f(V)$ and us(V) that replaces the understeer gradient parameter of the equation (4). Also, δ in the equation (4) is replaced with HWA. By these new factors, the vehicle velocity range (i.e., a range for V) in which the equation (5) is valid for HWA is extended from the vehicle velocity range in which the equation (4) is valid. That is, the hand wheel angle computed using the equation (5) is valid over a wider vehicle velocity range.

In some embodiments, the vehicle 10 has a hand wheel angle sensor that generates a hand wheel angle signal. In some such embodiments, the control command generation module 410 or another sub-module (not shown) of the control module 40 may use the hand wheel angle signal 420 to verify the hand wheel angle signal generated by the hand wheel angle sensor. The verification result may indicate whether the hand wheel angle sensor is functioning properly.

The control command generation module 410, like the control command generation module 215, generates one or more command signals 425 to control the steering system 12 (not shown in FIG. 4) based on input signals and vehicle parameters. The input signals to the control command generation module 410 include the hand wheel angle signal 420 and other signals from vehicle sensors 31-33 of the vehicle 10.

Figure 5:
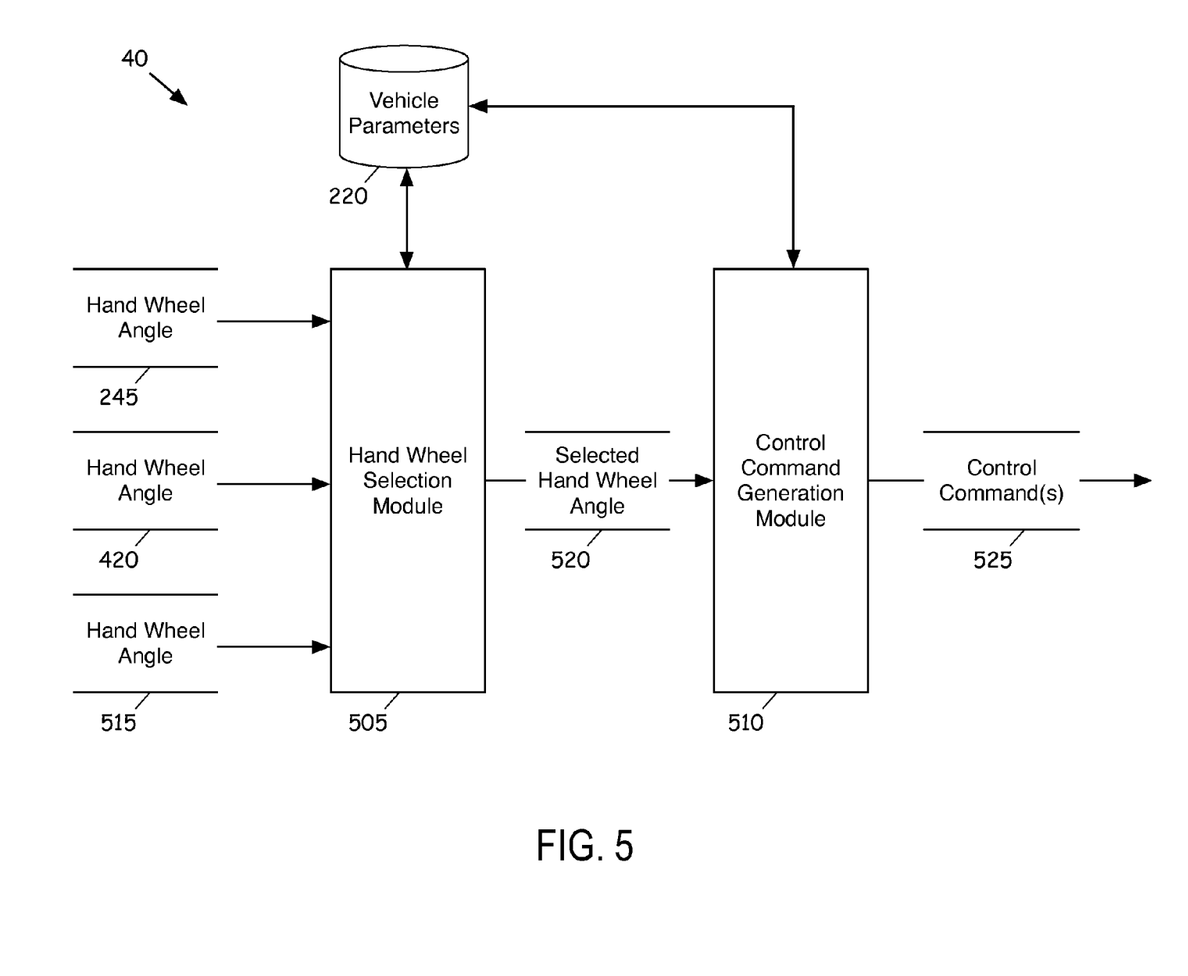
FIG. 5 illustrates a dataflow diagram illustrating a control module in accordance with exemplary embodiments of the invention.

FIG. 5 depicts a dataflow diagram of the control module 40 of FIGS. 1, 2 and 4 in accordance with some embodiments of the invention. In one example, the control module 40 includes a hand wheel angle selection module 505, a control command generation module 510, and the vehicle parameters repository 220. The hand wheel angle determination modules 210 and 405 are not depicted in FIG. 5 for simplicity of illustration.

Then hand wheel angle selection module 505 selects one of the hand wheel angle signal 245 generated by the hand wheel angle determination module 210, the hand wheel angle signal 420 generated by the hand wheel angle determination module 205, and a hand wheel angle signal generated by a hand wheel angle sensor of the vehicle 10. In some embodiments, the hand wheel angle selection module 505 selects a hand wheel angle signal that is deemed most valid. Different embodiments of the hand wheel angle selection module 505 employ different selection mechanisms to select the most valid signal. For instance, when all three of the hand wheel angle signals 245, 420 and 515 are within a threshold difference, the hand wheel angle selection module 505 selects the hand wheel angle signal 515. When one of the three signals stands out by being outside of a predetermined valid range, the hand wheel angle selection module 505 may select one of the other two signals. If the hand wheel angle sensor is determined to be unabled, the hand wheel angle selection module 505 selects one of the hand wheel angle signals 245 and 420.

The control command generation module 510, like the control command generation module 215, generates one or more command signals 525 to control the steering system 12

(not shown in FIG. 5) based on input signals and vehicle parameters. The input signals to the control command generation module 510 include the selected hand wheel angle signal 520 and other signals from vehicle sensors 31-33 of the vehicle 10.

Figure 6:
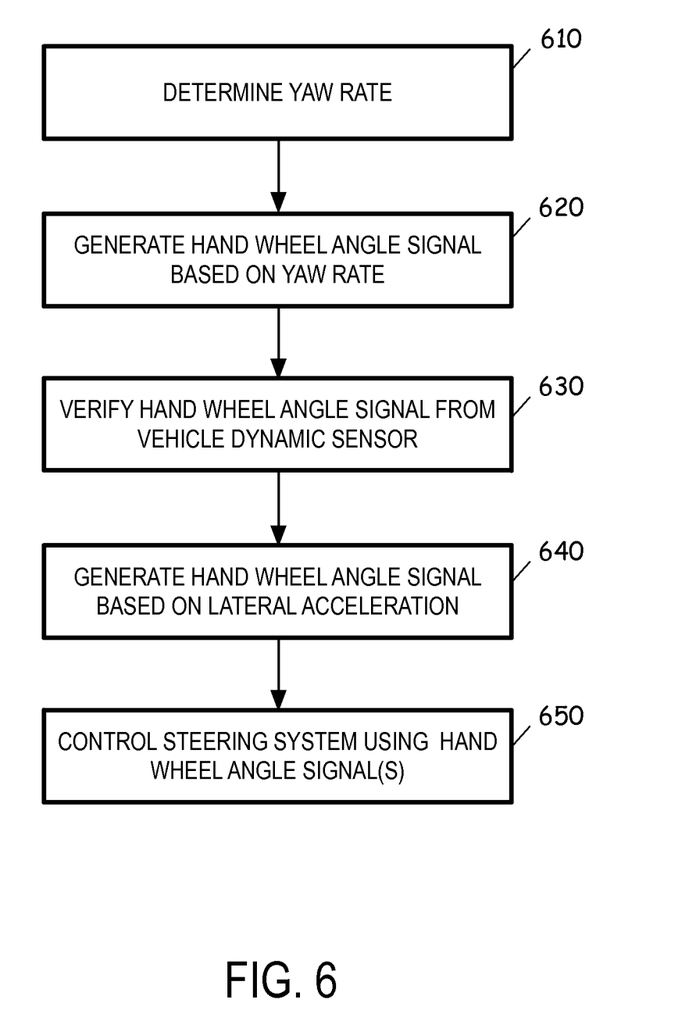
FIG. 6 illustrates a flow diagram illustrates a hand wheel angle determination method in accordance with exemplary embodiments of the invention.

Referring now to FIG. 6, a flow diagram illustrates a hand wheel angle determination method, which the control module 40 of FIGS. 1, 2, 4 and 5 may be configured to perform. As can be appreciated in light of the disclosure, the order of operation within the method is not limited to the sequential execution as illustrated in FIG. 6, but may be performed in one or more varying orders as applicable and in accordance with the present disclosure. In some embodiments, the method can be scheduled to run based on predetermined events, and/or run continually during operation of the vehicle 10.

At block 610, the control module 40 determines a yaw rate of the vehicle 10. In some embodiments, the control module 40 determines the yaw rate based on a measurement signal that indicates the yaw rate of the vehicle from a vehicle dynamic sensor of the vehicle 10. Alternatively or conjunctively, the control module 40 calculates the yaw rate based on wheel velocities of a pair of road wheels of the vehicle 10. Specifically, the control module 40 calculates a difference between the wheel velocities of the pair of road wheels. The control module 40 then calculates a ratio of the difference and a track width of the pair of road wheels. In some embodiments, the pair of road wheels are the rear wheels of the vehicle 10.

At block 620, the control module 40 generates a hand wheel angle signal that indicates a position of a hand wheel of the vehicle based on the yaw rate. In some embodiments, the control module 40 uses the equation (3) to generate a hand wheel angle signal based on the yaw rate. As indicated by the equation (3), the control module 40 may generate and use a speed correction factor that is a function of the velocity of the vehicle 10.

At block 630, the control module 40 of some embodiments optionally verifies a hand wheel angle signal received from a hand wheel angle sensor of the vehicle 10. The control module 40 compares the hand wheel angle signal generated at block 620 and the received hand wheel angle signal to verify the received hand wheel angle signal. Specifically, in some embodiments, the control module 40 determines that the received hand wheel angle signal is valid if the difference between the generated hand wheel signal and the received hand wheel signal is less than a predetermined threshold difference.

At block 640, the control module 40 of some embodiments optionally determines lateral acceleration of the vehicle 10 and generates a hand wheel angle signal based on the lateral acceleration. Specifically, the control module 40 uses the equation (5) to generate a hand wheel angle signal based on the lateral acceleration. In some embodiments, the control module 40 compares the hand wheel angle signal generated based on the yaw rate, the hand wheel angle signal generated based on the lateral acceleration, and the hand wheel angle signal received from the hand wheel angle sensor to select one of the three hand wheel angle signals.

At block 650, the control module 40 controls the power steering system by using the hand wheel angle signal. Specifically, in some embodiments, the control module 40 generates one or more control commands based on the hand wheel angle signal and other input signals and vehicle parameters. In some embodiments, the vehicle 10 does not have a hand wheel angle sensor. In these embodiments, the hand wheel angle signal generated at block 620 is used to control the steering system 12.

Figure 7:
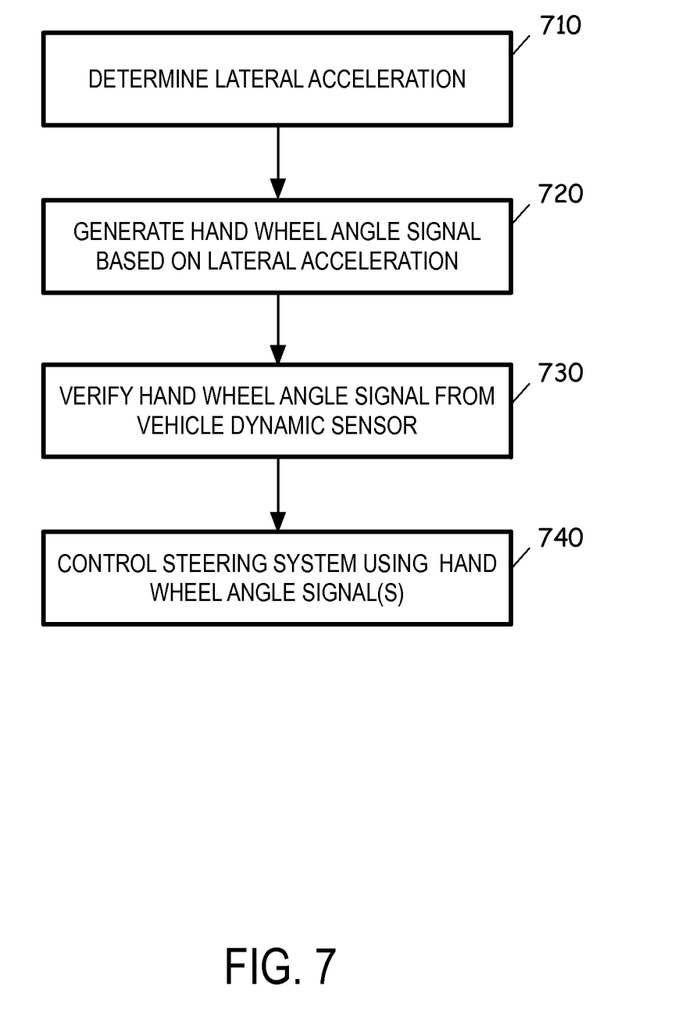
FIG. 7 illustrates a flow diagram illustrates a hand wheel angle determination method in accordance with exemplary embodiments of the invention.

FIG. 7 depicts a flow diagram illustrates a hand wheel angle determination method, which the control module 40 of FIGS. 1, 2, 4 and 5 may be configured to perform. As can be appreciated in light of the disclosure, the order of operation within the method is not limited to the sequential execution as illustrated in FIG. 7, but may be performed in one or more varying orders as applicable and in accordance with the present disclosure. In some embodiments, the method can be scheduled to run based on predetermined events, and/or run continually during operation of the vehicle 10.

At block 710, the control module 40 determines lateral acceleration of the vehicle 10. In some embodiments, the control module 40 determines the lateral acceleration based on a measurement signal that indicates the lateral acceleration of the vehicle from a vehicle dynamic sensor of the vehicle 10.

At block 720, the control module 40 generates a hand wheel angle signal that indicates a position of a hand wheel of the vehicle based on the lateral acceleration. In some embodiments, the control module 40 uses the equation (5) to generate a hand wheel angle signal based on the lateral acceleration. As indicated by the equation (5), the control module 40 may generate and use a speed correction factor that is a function of the velocity of the vehicle 10.

At block 730, the control module 40 of some embodiments optionally verifies a hand wheel angle signal received from a hand wheel angle sensor of the vehicle 10. The control module 40 compares the hand wheel angle signal generated at block 720 and the received hand wheel angle signal to verify the received hand wheel angle signal. Specifically, in some embodiments, the control module 40 determines that the received hand wheel angle signal is valid if the difference between the generated hand wheel signal and the received hand wheel signal is less than a predetermined threshold difference.

At block 740, the control module 40 controls the power steering system by using the hand wheel angle signal. Specifically, in some embodiments, the control module 40 generates one or more control commands based on the hand wheel angle signal and other input signals and vehicle parameters. In some embodiments, the vehicle 10 does not have a hand wheel angle sensor. In these embodiments, the hand wheel angle signal generated at block 620 is used to control the steering system 12.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while some embodiments of the invention have been described, it is to be understood that aspects of the invention may include only some of the described embodiments. Accordingly, the invention is not to be seen as limited by the foregoing description.

Having thus described the invention, it is claimed:

1. A method of controlling a power steering system of a vehicle, the method comprising:
   determining, by a processor, a yaw rate of the vehicle based on a wheel velocity, measured by a road wheel velocity sensor;
   generating a hand wheel angle signal, using a speed correction factor that is a function of a velocity of the vehicle, the hand wheel angle signal indicates a position of a hand wheel of the vehicle based on the yaw rate; and controlling the power steering system by using the hand wheel angle signal.

2. The method of claim 1, wherein the determining comprises receiving a measurement signal indicating the yaw rate of the vehicle from a vehicle dynamic sensor of the vehicle.

3. The method of claim 1, wherein the pair of road wheels of the vehicle are rear wheels of the vehicle.

4. The method of claim 1, wherein the calculating the yaw rate comprises using a difference between the wheel velocities of the pair of road wheels.

5. The method of claim 4, wherein the calculating the yaw rate comprises using a ratio of the difference and a track width of the pair of road wheels.

6. The method of claim 1, wherein the vehicle does not have a hand wheel angle sensor.

7. The method of claim 1, further comprising:
receiving a hand wheel angle signal that indicates a position of the hand wheel from a hand wheel angle sensor of the vehicle; and
comparing the generated hand wheel angle signal and the received hand wheel angle signal to verify the received hand wheel angle signal.

8. The method of claim 1, further comprising:
determining lateral acceleration of the vehicle;
generating a hand wheel angle signal that indicates a position of the hand wheel based on the lateral acceleration;
receiving a hand wheel angle signal that indicates a position of the hand wheel from a hand wheel angle sensor of the vehicle;
comparing the hand wheel angle signal generated based on the yaw rate, the hand wheel angle signal generated based on the lateral acceleration, and the hand wheel angle signal received from the hand wheel angle sensor to select one of the three hand wheel angle signals; and
controlling the power steering system by using the selected hand wheel angle signal.

9. A power steering system of a vehicle comprising:
an electric power steering system; and
a control module configured to:
determine, by a processor, a yaw rate of the vehicle based on a wheel velocity, measured by a road wheel velocity sensor;
generate a hand wheel angle signal using a speed correction factor that is a function of a velocity of the vehicle, the hand wheel angle signal indicates a position of a hand wheel of the vehicle based on the yaw rate; and
control the electric power steering system by using the hand wheel angle signal.

10. The system of claim 9, wherein the vehicle does not have a hand wheel angle sensor.

11. The system of claim 9, wherein the control module is further configured to:
determine lateral acceleration of the vehicle;
generate a hand wheel angle signal that indicates a position of the hand wheel based on the lateral acceleration;
receive a hand wheel angle signal that indicates a position of the hand wheel from a hand wheel angle sensor of the vehicle;
compare the hand wheel angle signal generated based on the yaw rate, the hand wheel angle signal generated based on the lateral acceleration, and the hand wheel angle signal received from the hand wheel angle sensor to select one of the three hand wheel angle signals; and
control the electric power steering system by using the selected hand wheel angle signal.

12. A method of controlling a power steering system of a vehicle, the method comprising:
determining, by a processor, lateral acceleration of the vehicle based on an output of a lateral acceleration sensor;
generating a hand wheel angle signal using a speed correction factor that is a function of a velocity of the vehicle, the hand wheel angle signal indicates a position of a hand wheel of the vehicle based on the lateral acceleration; and
controlling the power steering system by using the hand wheel angle signal.

13. The method of claim 12, wherein the determining comprises receiving a measurement signal indicating the lateral acceleration of the vehicle from a vehicle dynamic sensor of the vehicle.

14. The method of claim 12, wherein the vehicle does not have a hand wheel angle sensor.

15. The method of claim 12, further comprising:
receiving a hand wheel angle signal that indicates a position of the hand wheel from a hand wheel angle sensor of the vehicle; and
comparing the generated hand wheel angle signal and the received hand wheel angle signal to verify the received hand wheel angle signal.

* * * * *